Jan. 21, 1936.  H. LIGHT  2,028,676

AMUSEMENT DEVICE

Filed Oct. 17, 1934   5 Sheets-Sheet 1

WITNESSES:

INVENTOR:
HARRY LIGHT
BY
ATTORNEY

Jan. 21, 1936. H. LIGHT 2,028,676
AMUSEMENT DEVICE
Filed Oct. 17, 1934 5 Sheets-Sheet 2
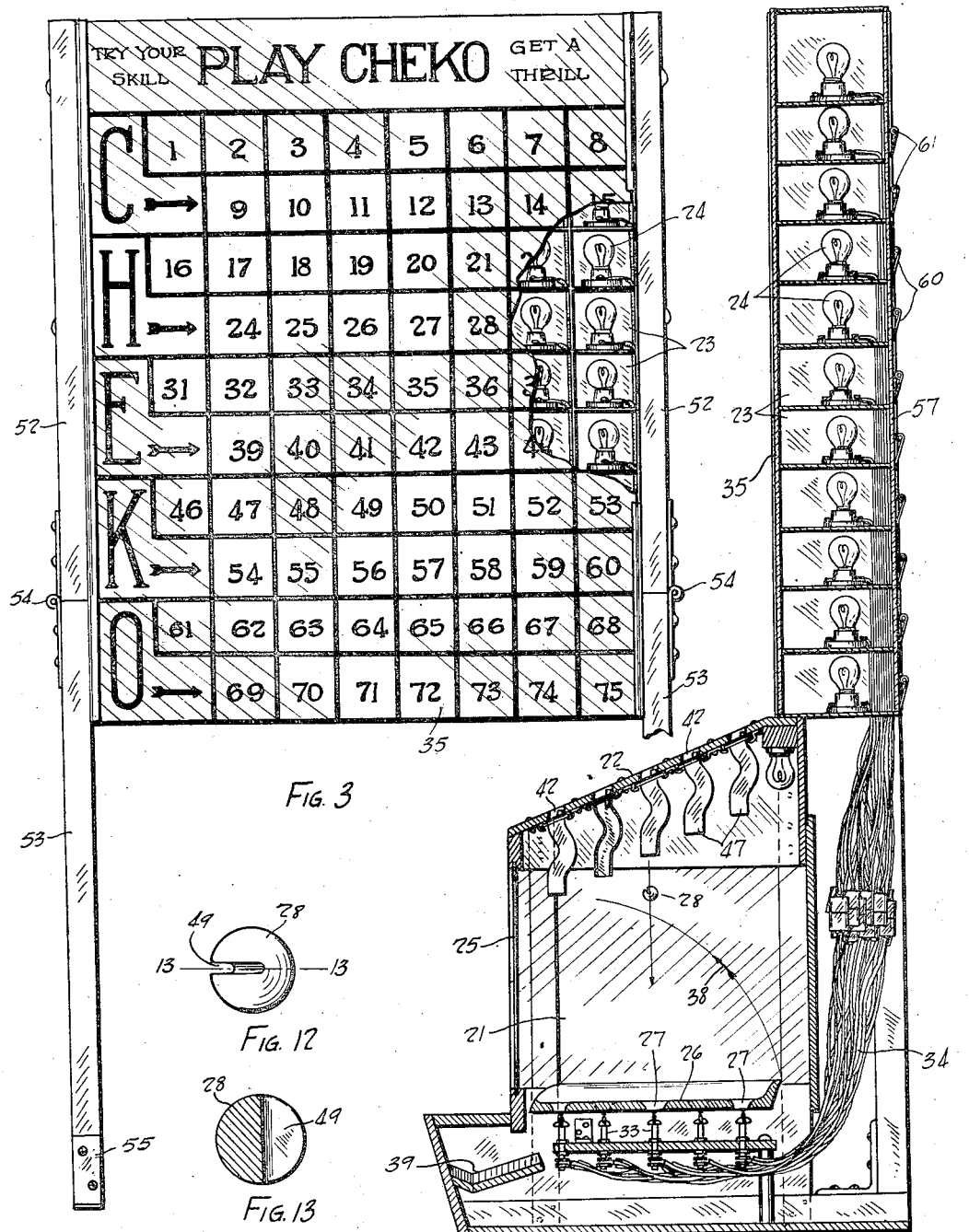
WITNESSES:
Jackson T. Normann
Anna M. Ward
INVENTOR:
HARRY LIGHT
BY Joshua R. H. Potts
ATTORNEY Jan. 21, 1936.     H. LIGHT     2,028,676
AMUSEMENT DEVICE
Filed Oct. 17, 1934     5 Sheets-Sheet 3

WITNESSES:

INVENTOR:
HARRY LIGHT
BY
ATTORNEY

Jan. 21, 1936.  H. LIGHT  2,028,676
AMUSEMENT DEVICE
Filed Oct. 17, 1934   5 Sheets-Sheet 4

WITNESSES:

INVENTOR:
HARRY LIGHT
BY
ATTORNEY

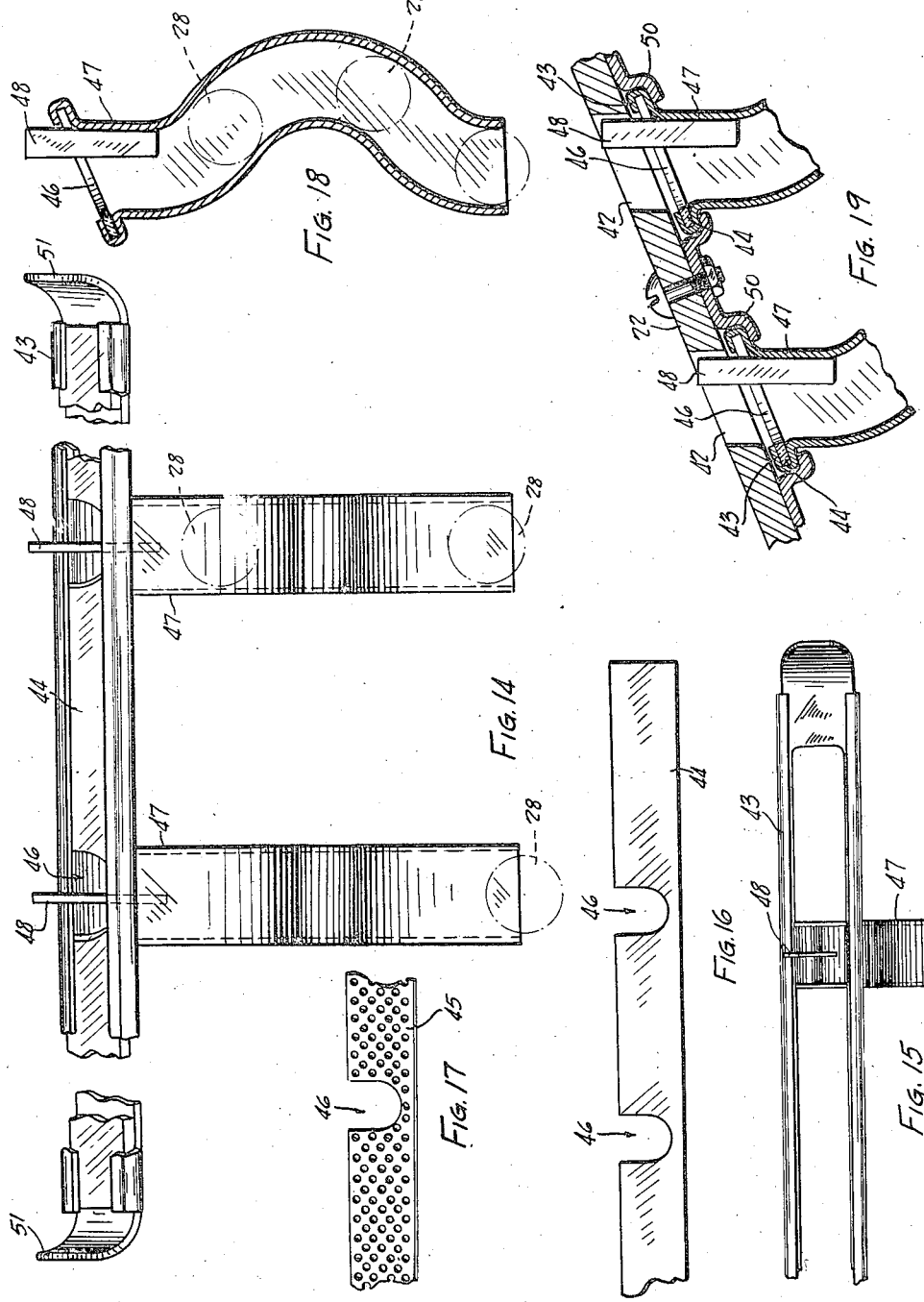

Patented Jan. 21, 1936

2,028,676

UNITED STATES PATENT OFFICE 2,028,676

AMUSEMENT DEVICE

Harry Light, Atlantic City, N. J.

Application October 17, 1934, Serial No. 748,649

21 Claims. (Cl. 273—102)

This invention relates to amusement devices, and has for an object to provide a device wherein the player selects in advance a receptacle and attempts to drop a ball into the receptacle through passages provided for the purpose.

A further object of the invention is to provide an amusement device having a part provided with a plurality of receptacles, each one of which is adapted to receive and retain a ball, and means located above said part having movable members each provided with a chute or a plurality of chutes, some one of which may, by the player, be moved to a position above the receptacle into which he wishes to deposit a ball through the chute.

A further object of the invention is to provide a part having a plurality of ball-receiving receptacles with proper electrical connections actuated by a ball or a plurality of balls in the receptacle, closing circuits to compartments numbered similar to the receptacles so that the play as accomplished by the dropping of the ball into the receptacle, will register upon a transparent numbered plate.

A further object of the invention is to provide an amusement device having a plurality of compartments, each with its illuminating element properly designated to tally a play, and having a reverse or rear side with transparent parts similarly numbered, and manually operable covers for the transparent parts so that an illuminated compartment may be designated by closing the transparent part communicating therewith.

A further object of the invention is to provide a playing device comprising a plurality of sliding members having openings therethrough for receiving balls of predetermined contour, with chutes movable with the movable parts, said chutes being provided with bends preventing the introduction of a rod or the like therethrough for disturbing the balls as deposited in a receptacle beneath the chutes when dropped through such chutes.

A further object of the invention is to provide a member having a plurality of ball-receiving receptacles, said member being hinged and provided with means upon the exterior of the device for tilting the member so that all of the balls deposited in any of the receptacles will simultaneously be discharged therefrom and returned to the player or to an attendant.

A further object of the invention is to provide an amusement device employing a ball or a plurality of balls which said balls are deformed in such a manner that only balls of the particular contour may be employed in the particular device to which they appertain.

The invention, therefore, comprises a cabinet having a back or upright part including a plurality of compartments each with an illuminating element and covered by a transparent sheet properly designated to determine the value or other requirement of the game, which will be illuminated by the illuminating element, the rear of said upright part being provided with a sheet having transparent openings designated similar to the front designations, with cover members manually closeable over the transparencies to obliterate the illumination apparent at the rear of the cabinet, said cabinet having further a front part preferably inclined, with a plurality of transversely extending openings closed by slides, said slides having openings therethrough for the passage of a deformed ball and each such passage provided with a chute with an underlying board or member having a plurality of receptacles, the number preferably corresponding to the compartments in the upright part and similarly designated, said receptacle member being hinged adapted to be raised upon its hinge by the utilization of an exterior part to dump simultaneously balls contained in all of the receptacles, each of said receptacles having an underlying switch adapted to be closed by a ball in that receptacle to close circuit to the corresponding illuminating elements in the compartments of the upright part.

The drawings illustrate an embodiment of the invention and the views therein are as follows:

Figure 2 is a vertical sectional view taken on line 2—2 of Figure 1,

Figure 3 is a detail view of the upright part showing the means by which it is attached to the base or lower part, and broken away to show the illuminating elements within the compartments.

Figure 6:
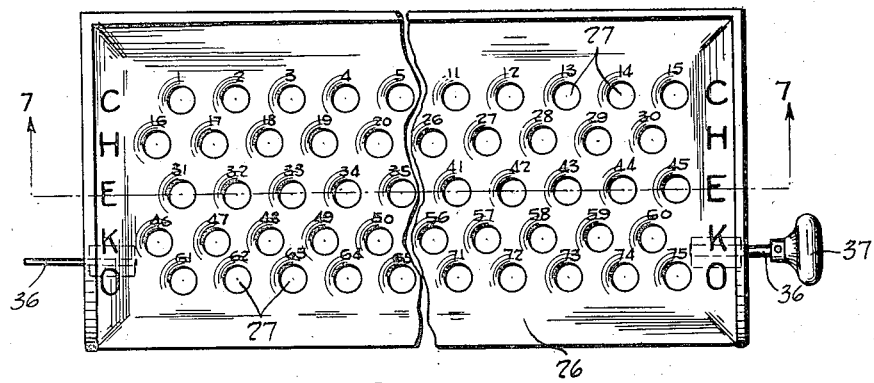
Figure 7:
Figures 8, 9:
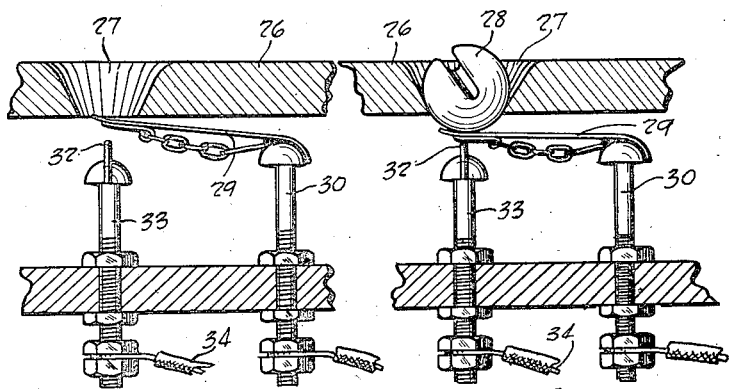
Figures 10, 11:
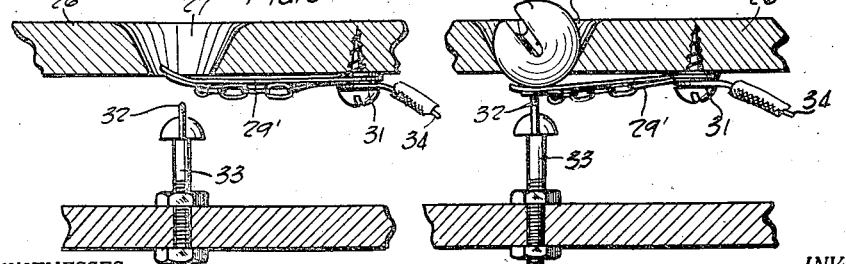

Figure 6 is a plan view of the device provided with a plurality of ball-receiving receptacles, Figure 7 is a longitudinal sectional view taken on line 7—7 of Figure 6, Figure 8 is an enlarged detail sectional view of one of the receptacles and its underlying switch, Figure 9 is a similar sectional view showing a ball in the receptacle with the switch closed, Figure 10 is a view similar to Figure 8 but with a modified type of switch, Figure 11 is a detailed view similar to Figure 9, with the modified type of switch shown at Figure 10, Figure 12 is a view of one of the balls, Figure 13 is a sectional view of the ball taken on line 13—13 of Figure 12, Figure 14 is a detailed perspective view of one of the chute carrying slides, Figure 15 is a plan view of the framework of one of the slides, Figure 16 is a plan view of the transparent strip forming a part of the completed slide, Figure 17 is an alternative strip showing perforations as distinguished from transparency, Figure 18 is a vertical sectional view of one of the chutes, and Figure 19 is an enlarged detailed view of the slides and the top ends of the chutes, shown in vertical section.

Like characters of reference indicate corresponding parts throughout the several views.

The improved amusement device which forms the subject matter of this application comprises a cabinet having a base 20 with ends 21 erected thereon, and provided with an inclined top 22. Above this inclined top is also an upright cabinet having a plurality of compartments 23 each containing an illuminating element 24.

The front of the lower part of the cabinet is preferably composed of a transparent sheet 25, as for instance, glass, so that through this transparent sheet may be seen the receptacle member 26. The receptacle member 26 is provided with a plurality of receptacles 27 formed merely as holes in the member 26 with said holes having inclined balls, the larger part being adapted to receive the ball 28, but the smaller part being small enough to prevent the passage of the ball entirely therethrough, but to provide for a segment to extend below the plane of the member 26, as shown more particularly at Figures 9 and 11, so that the protruding segment may engage the switch 29 or 29' which are carried upon binding posts 30, as shown at Figures 8 and 9, or secured to the member 26 by binding posts 31, as shown at Figures 10 and 11.

In either case the switches when depressed make contact with contact parts 32 carried upon binding post 33 and through the circuits represented by the wires 34 in Figure 2, to energize the illuminating elements 24.

It will be noted, especially from a plan view of the member 26 shown at Figure 6, that each of the various receptacles is provided with a designation, particularly a numeral, and that each numeral corresponds to the numerals appearing upon the plate 35 forming the front of the upright part of the cabinet so that one of the balls 28 in one of the receptacles 27 will depress the corresponding switch and illuminate a compartment in the upright part, having a designation upon the transparent plate 35 corresponding to the designation or number of the particular receptacle in the member 26.

The member 26 is mounted upon trunnions 36 which are journaled in the end members 21 and upon the exterior of the cabinet, some means, as the knob 37, is provided for tilting the member 26 upon its journal, as indicated by the arc and arrow 38 at Figure 2, whereby the vertical position of the member 26 will discharge any and all balls contained in any or all receptacles into a trough 39 in the base 20. Preferably, this trough will communicate with a runway or conduit 40 along the side of the machine and discharge the balls into a receptacle 41 at the rear of the machine where they may be removed by an attendant. It is obvious, of course, that the balls may be otherwise disposed of.

The inclined top 22 is provided with a plurality of laterally extending slots 42 located immediately over the rows of receptacles 27 in the member 26. Each of these slots 42 is provided with a sliding member preferably made up of a frame 43 and a transparent strip 44, as shown at Figure 16, or, if preferred, a perforated strip 45, as shown at Figure 17. In any event, this strip is provided with a plurality of notches 46 properly proportioned for the ball 28 to pass therethrough. Underlying each of these notches is a chute 47 so bent that a rod or similar article may not be passed therethrough to disturb the attained position of a ball discharged from the chute, also to prevent the direct sighting or aiming of the chute at some chosen underlying receptacle 27, the aiming or pointing of the chute being accomplished by looking through the transparent strip 44 upon either side of the chute or through the perforations of the strip 45.

As it is desirable to restrict the use of the device to balls intended for use with that particular machine, the chutes are provided with means for cooperating with deformed balls here shown as strips 48, which will coact with a diametrical slot 49 formed in the ball. As shown at Figures 12 and 13, the slot extends substantially one-half the distance through the ball, that is to say, the hemispheres are connected upon one side of a dimetrical line.

The slides carrying the strips 44 are mounted to slide in any approved manner, guides 50 being shown especially at Figure 19 for supporting the frames 43 which extend beyond the lateral sides of the cabinet, and are provided with means facilitating the manual operation as the upturned or hooked ends 51.

For convenience of assembling, disassembling and packing, the top of the cabinet is made removable from the base and is supported by means of bars 52 and 53, hinged at 54 and secured to the base in any approved manner, as by the attaching member 55 shown more particularly at Figure 3. The base is also provided with a switch 56 conveniently located to control the current of the several circuits.

At the rear of the upright, also preferably a sheet of normally transparent material 57, is provided obscured in any approved manner, as by the coating 58, leaving transparent sections 59 which are illuminated by the illuminating elements 24 in the compartments, and are designated similar to the designations of those compartments upon the front plate 35.

Figure 1:
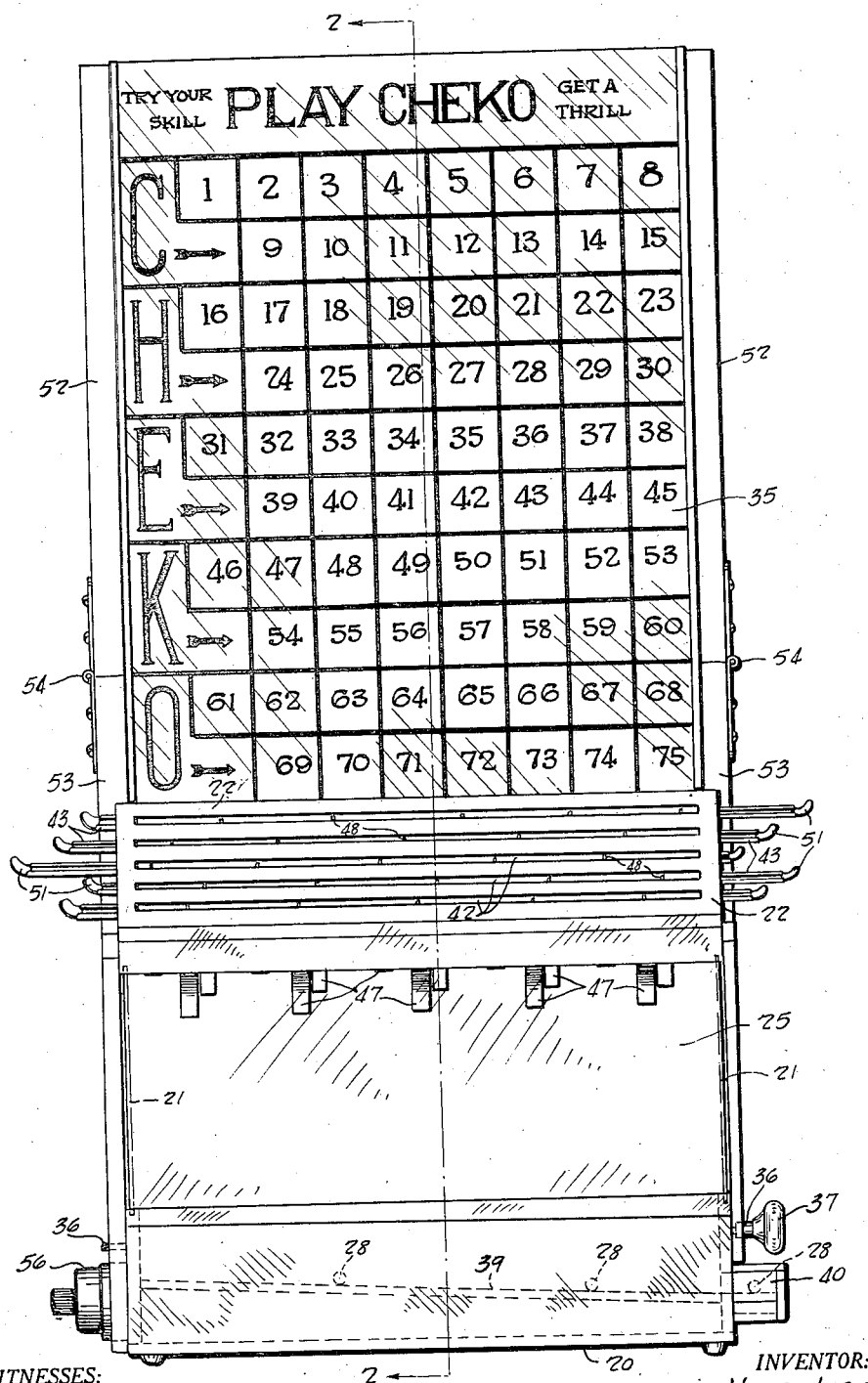
Figure 1 is a view of the amusement device in front elevation.
Figure 5:
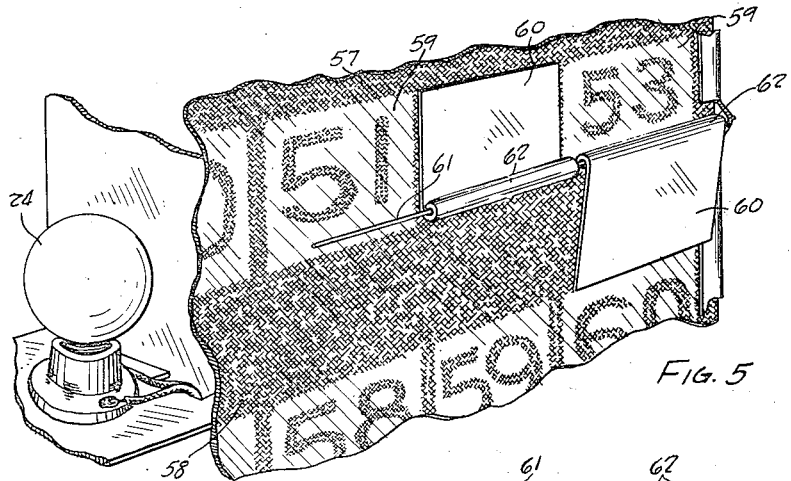
Figure 5 is a fragmentary detailed view of the rear of the device showing the covers manually closable.
Figure 4:
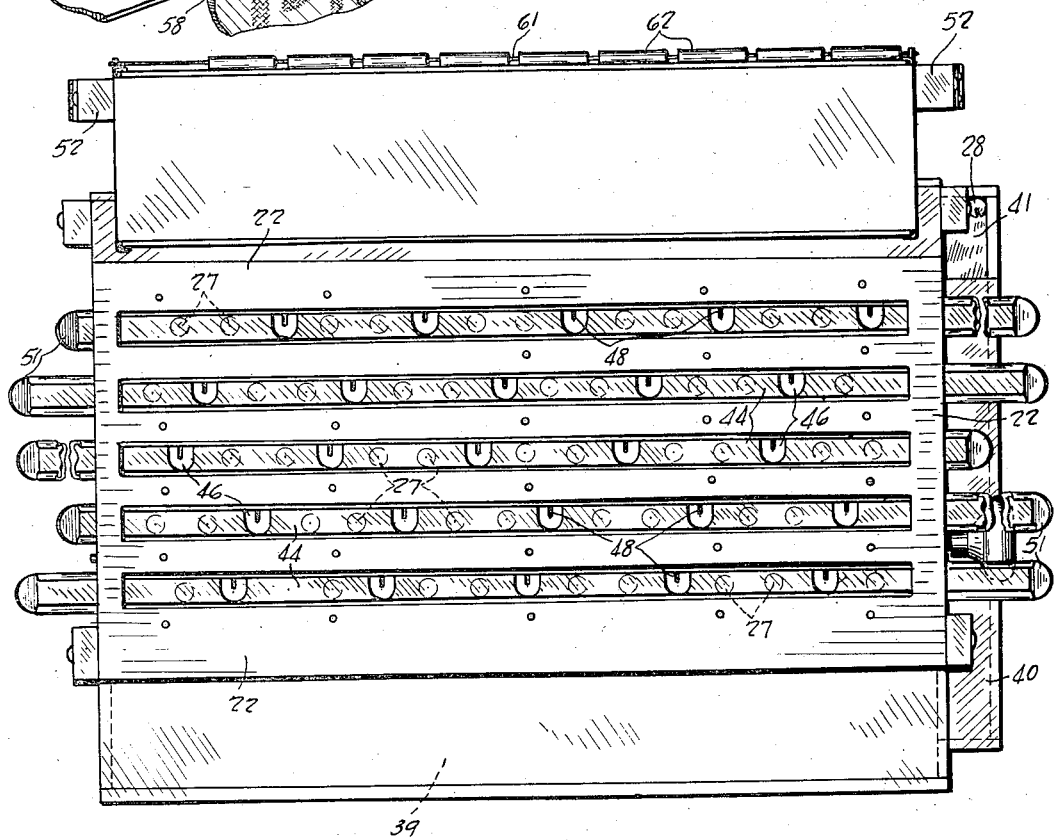
Figure 4 is a top plan view of the device.

The rear of the cabinet is provided with a plurality of cover members 60 hinged in any approved manner. As shown in the drawings, wires 61 are employed and the cover members 60 provided with sleeves 62 embracing said wires so that they may be manually moved from the open to closed position, as shown at Figure 5. The use of these will depend upon the manner in which the amusement device is employed, but it is contemplated that the attendant at the rear of the machine will close one of the covers 60 upon the illumination of any one of the compartments so as to be able to detect instantly the next compartment illuminated.

At the proper time, as for instance the end of the play, the compartments which have been closed by the cover members 60 will also be perfectly apparent from the rear of the cabinet, and such check-up or record made as consistent with the amusement being indulged in.

The operation of the device will depend entirely upon the game or amusement and may be variously employed. As an example, however, the player will be furnished with a predetermined number of the balls 28. He will be advised of the relative values in the final tally of the various numerals or designations represented by the various receptacles 27 and as shown upon the front plate 35 or rear plate 57.

He will then move any one of the sliding members represented by the frames 43 longitudinally by manipulating the ends shown at 51, attempting to aim some one of the chutes 47 at a desired receptacle, that, naturally, having the highest value in the count.

By reason of the fact that the player cannot look directly through one of the chutes 47, but must do it from opposite sides, it will be found difficult to so locate one of the openings 46 that the ball introduced through that opening and its underlying chute will be deposited in the chosen receptacle 27, especially in view of the fact that while rolling through the chute 47 the ball will be given a rotary movement, which will probably deflect it from a direct drop, as indicated at Figure 2, and the unbalancing of the ball, by reason of its deformity, will further add an erratic element to its travel.

While it thus represents a game of skill, there is an element of chance introduced by reason of the contingencies just referred to, so that even an expert player will be confused as to the proper positioning of the chutes.

As each ball is introduced into a receptacle, the switch 29 or 29′ is depressed into engagement with the contact 32 and through the wiring 34 closes a circuit to one of the illuminating elements 24 in one of the compartments 23, the designation of such a compartment upon the front transparent sheet 35 and the rear sheet 57 corresponding, as has been explained, to the similar designation of the particular receptacle in which the ball has been deposited.

As each successive ball is deposited in one of the receptacles, the corresponding compartment is illuminated so that when all of the balls furnished the player have been played, the numerals or other compartment designations appearing upon the sheets 35 and 57 will determine the score of the player, such designations having, naturally, different values in the final count.

After all of the balls furnished have been played and are occupying their several receptacles, the member 26 is tilted to substantially an upright position, as indicated by the curve 38 at Figure 2, and all of the balls lifted thereby from making switch contacts and dumped from their several receptacles into the trough 39 from which they may be removed, or will travel about the conduit 40 to a position to be removed by an attendant at the rear of the cabinet.

As has been explained, the attendants may, as compartments are illuminated, cover the illuminated sections of the sheet 57 with the covers 60 so that only the instant compartment will be illuminated, which will then be covered and the final score or reading will be determined from the cover members which have been manually erected.

Of course, the amusement device illustrated may be modified and changed in various ways without departing from the invention herein set forth and hereinafter claimed.

I claim:—

1. An amusement device comprising a cabinet having openings therein, an underlying substantially horizontal member having a plurality of receptacles, a trough, and means to tilt the member to a substantial vertical position to discharge game pieces from the receptacles to the trough.

2. An amusement device comprising a cabinet having openings therein, a member underlying the openings, said member having a plurality of receptacles, switch members underlying the receptacles, a plurality of compartments, illuminating elements in the compartments in circuit with the switches, and means to tilt said member away from the switch members.

3. An amusement device comprising a cabinet having slots in its upper part, sliding members within the slots having openings therethrough, and an underlying member having receptacles greater in number than the openings in the sliding members.

4. An amusement device comprising a cabinet having a plurality of slots in its upper part, members mounted to slide in the slots and provided with a plurality of openings, chutes associated with the openings, and receptacles underlying the chutes.

5. An amusement device comprising a cabinet having a plurality of slots extending transversely of its top, an underlying part having a plurality of receptacles arranged in rows corresponding in number to the slots, and slides mounted in the slots and provided with openings of lesser number than the receptacles.

6. An amusement device comprising a cabinet having a plurality of slots in its upper surface, a plurality of receptacles underlying the slots, said receptacles being arranged in rows corresponding in number to the slots, slides mounted in the slots and provided with openings therethrough, chutes underlying the openings and directed toward the rows of receptacles, and means at the entrance of the chutes for cooperation with specially contoured game pieces.

7. An amusement device comprising a cabinet having slots in its upper surface, a member underlying the slots and provided with a plurality of receptacles larger at the top than the bottom, a game piece adapted to be inserted through some of the slots and into a receptacle, the lower part to project through the receptacle, switches located beneath the receptacles adapted to be closed by the projected part of the game piece, a plurality of compartments, an illuminating element in each of said compartments in circuit with corresponding switches, and means to move the member away from parts of the switches whereby the switches are opened.

8. An amusement device comprising a cabinet having openings in its upper surface, an underlying member provided with a plurality of receptacles, the sides of which converge, a game piece adapted to be introduced through the openings and dropped into some one of said receptacles and to project through the convergent openings, switches underlying the receptacles adapted to be closed by the projected part of the game piece, a plurality of compartments, illuminating elements in the compartments in circuit with the switches, and means to raise the member to open the switches and to discharge the game pieces from the receptacles.

9. An amusement device comprising a cabinet having an upper deck provided with transversely extending slots, a member underlying the deck having receptacles arranged in transverse rows corresponding in number to the slots, said receptacles having sides converging downwardly to an opening at the bottom smaller than at the top, a ball adapted to be dropped through some one of the slots into some one of the receptacles and to project a segment through the opening at the bottom of the receptacles, a switch underlying each of the receptacles adapted to be closed by the projected segment of the ball, compartments corresponding in number to the receptacles, an illuminating element in each of the compartments in circuit with a switch, said compartments and corresponding receptacles being equivalently designated, a trough, and means to tilt the receptacle member to open the switches and discharge the balls from the receptacles into the trough.

10. An amusement device comprising a cabinet having an inclined upper deck provided with a plurality of transversely extending slots, slides mounted in the slots having openings therethrough, chutes mounted beneath each of said slots and constructed with bends interrupting any right line passage therethrough, and receptacles underlying the chutes for receiving game pieces therefrom.

11. An amusement device comprising a cabinet having an inclined upper deck provided with a plurality of transversely extending slots, slides mounted in the slots having openings therethrough, chutes mounted beneath each of said slots and constructed with bends interrupting any right line passage therethrough, and receptacles underlying the chutes for receiving game pieces therefrom, said chutes being provided adjacent to their receiving ends with means for coaction with selectively contoured game pieces.

12. An amusement device comprising a cabinet having an inclined upper deck provided with a plurality of transversely extending slots, slides mounted in the slots, said slides being of material permitting a view therethrough and provided with openings, an underlying member having receptacles arranged in rows corresponding in number to the slots and in each row a greater number than the openings in the slides, said slides being adapted to be manually moved to bring an opening over a selected one of the receptacles, and means at the opening for controlling the introduction of a game piece.

13. An amusement device comprising a cabinet having a plurality of compartments, a translucent cover for the compartments, said translucent cover carrying designations particularly identifying the compartments, a second covering member on the opposite side of the compartments having translucent areas similarly designated, illuminating elements within the compartments, cover members adapted to be manually closed over the translucent areas of the last mentioned compartment cover, and means to employ game pieces to close circuits to said illuminating elements.

14. An amusement device comprising a cabinet having an inclined upper deck provided with a plurality of transversely extending slots, slides mounted within the slots and including transparent parts having openings therein proportioned to receive game pieces, a member underlying the deck having receptacles arranged in rows corresponding in number to the slots, receptacles in the rows greater in number than the openings in the slides, a rib mounted in the openings, and a ball having a slot projected from one side toward a diameter adapted to cooperate with the rib for introduction through the opening of the slide.

15. An amusement device comprising a cabinet having a tiltable member mounted therein, said member being provided with a plurality of sockets, the sidewalls of which converge downwardly to form an opening smaller at the bottom than at the top, means to introduce balls to drop into said receptacles and project below the smaller openings, switches mounted to be actuated by the projected segment of the ball, and means externally of the cabinet to tilt the member to a substantially vertical position to remove the balls from the switch closing position, and means to receive the balls discharged from the receptacles incident to said tilting.

16. In an amusement device, a member provided with a plurality of rows of receptacles and a slide mounted above the member provided with a chute having one terminal carried by said slide and provided with entrance facilities, the other terminal being straight and directed toward some of the receptacles and provided with a bend intermediate its ends interrupting any right line between the terminals, and means to move the slide to position the chute above the selected receptacle in the row.

17. In an amusement device, a member having a plurality of receptacles, such receptacles having tapered sides and an open bottom, a switch underlying the open bottom adapted to be closed by a marker in one of said receptacles, means to move the receptacle carrying member, and means resultant from said movement to open the closed switch.

18. In an amusement device, a plurality of upstanding contact members, a plate positioned above the contact members and having receptacles registering with some of said members, said receptacles having tapered sides and an open bottom adapted to employ a marker therein to depress the switch part into closing relation, means to move the plate, and means tending to open the switches when the plate is moved.

19. In an amusement device, a slotted deck, a plurality of slides mounted in said slots and extending beyond the ends of the deck, said slides being provided with marker receiving openings.

20. In an amusement device, a deck provided with a plurality of longitudinally extending slots, slides mounted in said slots and extending beyond the ends of the deck, said slides permitting a view therethrough, and provided with a plurality of marker entrances.

21. In an amusement device, a slotted deck, a plurality of slides mounted in said slots and extending beyond the ends of the deck, said slides being composed, in part, of transparent material, and provided with marker openings.

HARRY LIGHT.